F. B. MILLER.
CLASS ROOM SANITARY WARDROBE AND BLACKBOARD.
APPLICATION FILED OCT. 8, 1917.
1,268,038.
Patented May 28, 1918.
3 SHEETS—SHEET 1.
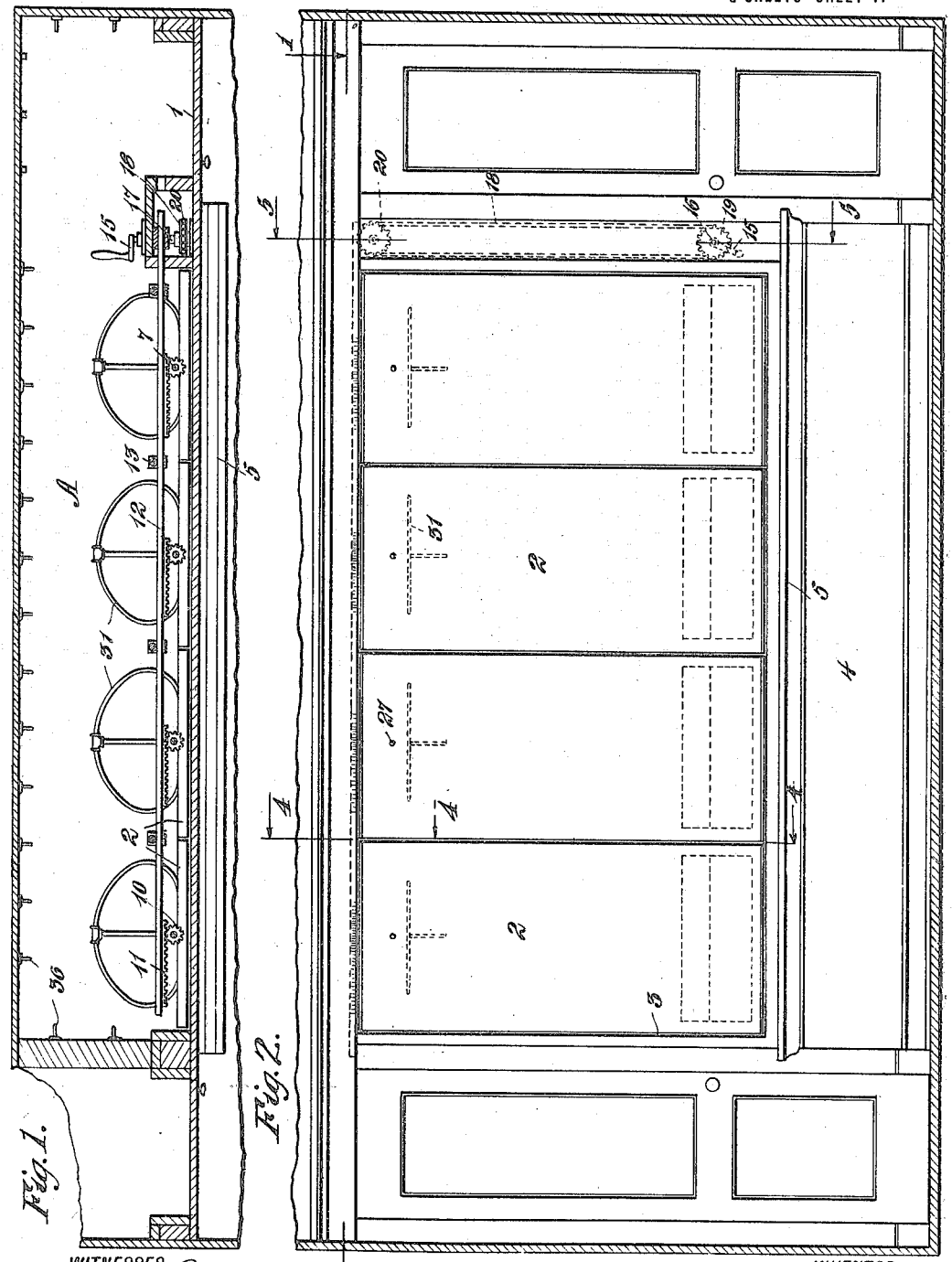
WITNESSES
INVENTOR
F. B. Miller
BY
ATTORNEYS

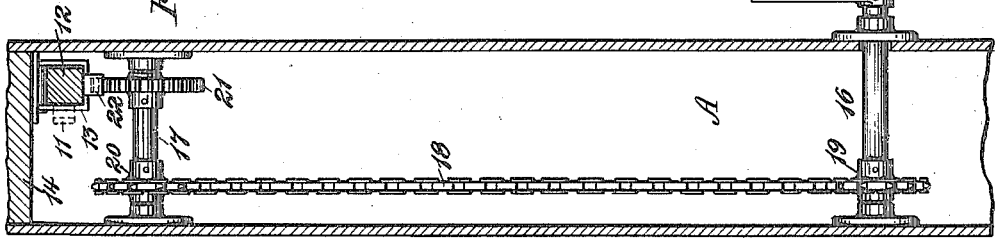

F. B. MILLER.
CLASS ROOM SANITARY WARDROBE AND BLACKBOARD.
APPLICATION FILED OCT. 8, 1917.
1,268,038.
Patented May 28, 1918.
3 SHEETS—SHEET 3.
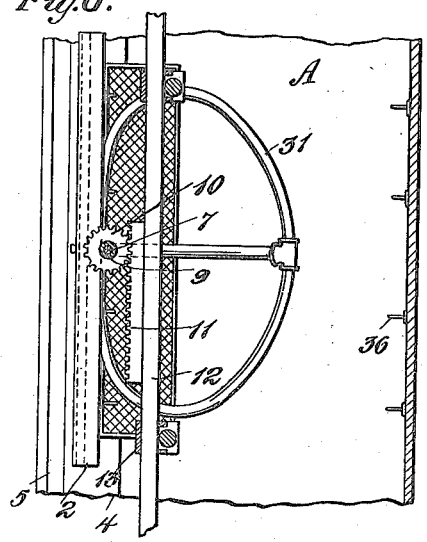
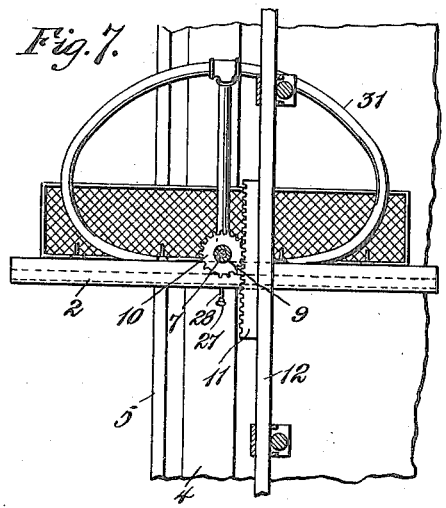
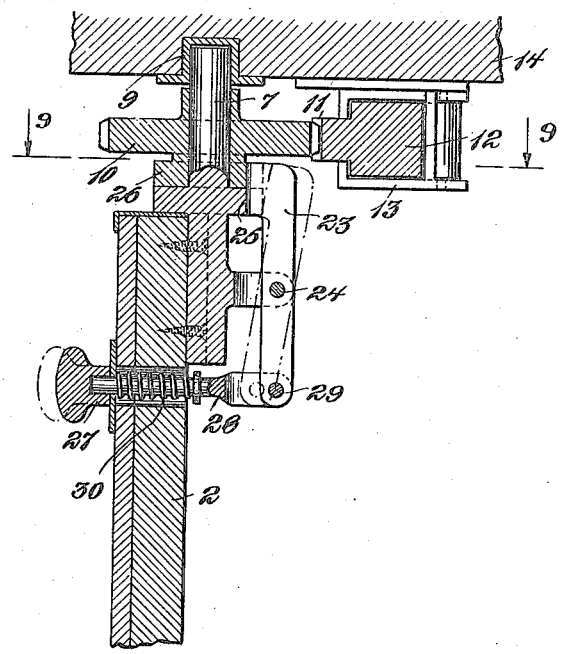
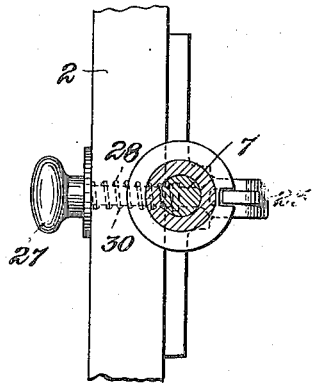
WITNESSES
Frank J. Faggiani
C. Brodway
INVENTOR
F. B. Miller
BY
ATTORNEYS

UNITED STATES PATENT OFFICE.

FRANK B. MILLER, OF JEFFERSON CITY, MISSOURI.

CLASS-ROOM SANITARY WARDROBE AND BLACKBOARD.

1,268,038.  Specification of Letters Patent.  Patented May 28, 1918.

Application filed October 8, 1917. Serial No. 195,383.

*To all whom it may concern:*

Be it known that I, FRANK B. MILLER, a citizen of the United States, and a resident of Jefferson City, in the county of Cole and State of Missouri, have invented a new and Improved Class-Room Sanitary Wardrobe and Blackboard, of which the following is a full, clear, and exact description.

This invention relates to a combination wardrobe and blackboard designed for class-rooms, schools, churches and other institutions.

The invention has for its general objects to provide an improved wardrobe construction which is comparatively simple and inexpensive to manufacture and install, reliable and efficient in use and so designed as to economize space.

A more specific object of the invention is the provision of a wardrobe, the front of which is in the form of one or more blackboard sections mounted to turn on a central vertical axis, whereby the back of a blackboard section may be employed for supporting the pupils' garments, said blackboard sections being independently or simultaneously operated by means of a mechanism of simple and novel construction.

With such objects in view, and others which will appear as the description proceeds, the invention comprises various novel features of construction and arrangement of parts which will be set forth with particularity in the following description and claims appended hereto.

In the accompanying drawings which illustrate one embodiment of the invention and wherein similar characters of reference indicate corresponding parts in all the views, Figure 1 is a horizontal section of the wardrobe on the line 1—1, Fig. 2;

Fig. 2 is a front view showing the blackboard sections in normal position;

Fig. 3 is a rear view of one of the blackboard sections to show the garment-hanging means, the view being taken on the line 3—3, Fig. 4;

Fig. 4 is a vertical section on the line 4—4, Fig. 2;

Fig. 5 is a vertical section on the line 5—5, Fig. 2;

Fig. 6 is a detail sectional view on the line 6—6, Fig. 4;

Fig. 7 is a smaller view showing one of the blackboard or wardrobe sections turned half way around.

Fig. 8 is a large detail view showing the blackboard section releasing device, whereby the said section is released from the common actuating means for the several sections, the section being taken on the line 8—8, Fig. 3; and Fig. 9 is a detail sectional view on the line 9—9, Fig. 8.

Referring to the drawing, A designates a wardrobe or closet which has a door 1 at its front near one end, and also at the front are provided a plurality of panel-like sections 2 arranged side by side in an opening 3 in the front wall 4 of the wardrobe. Preferably, the panels 2 are sections of a blackboard under which is a chalk-carrying rail 5 on the front of the wardrobe. Each section 2 has a central pivot 6 at its bottom and 7 at its top which turn in bearing sockets 8 and 9, respectively, in the top and bottom of the opening 3. The upper pivots 7 carry pinions 10 which mesh with teeth 11 on a longitudinal reciprocatory rack bar 12 which extends horizontally of the wardrobe at a point above the blackboard sections 2, said rack bar being guided in bearings 13 on the ceiling 14. The rack bar is adapted to be moved longitudinally to turn the blackboard or wardrobe sections 2 through one hundred and eighty degrees so that the rear or inner face of each section will be brought to the front for enabling the garments to be hung up or removed. The rack bar is operated by a crank 15 arranged within the wardrobe at a point adjacent the door 1, and this crank is arranged on a shaft 16 which is connected with an overhead horizontal shaft 17 by a sprocket chain 18 and sprocket wheels 19 and 20 on the said shafts, respectively. On the shaft 17 is a pinion 21 which meshes with rack teeth 22 on the rack bar. By turning the crank 15 all the sections 2 turn at once.

It may be desirable to turn the panel sections separately, and for this purpose a releasing device is employed at each section so that the same can be released from the operating means. For this purpose the pinion 10 is loose on its respective pivot 7 and a pawl 23 pivoted at 24 on the rear side of each section 2 engages in a notch 25 of the hub 26. A pull button 27 is exposed at the front of each blackboard section adjacent the top, and the stem 28 of the button is connected at 29 with the lower end of the pawl 23. A spring 30 surrounds the stem 28 and acts in such a manner as to hold the pawl in locking position, as shown by the full lines, Fig. 8. When the button or knob 27 is pulled forwardly the pawl 23 is thrown to the broken-line position, so that the panel 2 is released from the pinion 10, and said panel can be turned separately on its pivots.

On the rear of each section 2 may be provided any suitable means for holding wearing apparel of the pupils. For instance, a rack 31 of any suitable construction is arranged at the top of the panel to support coats, and individual coat hanger hooks 32 may be arranged directly on the panel, as well as spring clips 33 for holding hats and caps. Adjacent the bottom of the panel is a basket 35 for holding rubbers. Extra hooks 36 may be arranged on the inner walls of the wardrobe, as clearly shown in Fig. 1.

From the foregoing description taken in connection with the accompanying drawings, the advantages of the construction and method of operation will be readily understood by those skilled in the art to which the invention appertains, and while I have described the principle of operation, together with the structure which I now consider to be the best embodiment thereof, I desire to have it understood that the structure shown is merely illustrative and that such changes may be made when desired as fall within the scope of the appended claim.

Having thus described my invention, I claim as new and desire to secure by Letters Patent:

A wardrobe including a plurality of blackboard sections, each having garment-hanging means on its rear side, a pivot on which each section turns, a pinion loose on each pivot, a locking device mounted on each section and releasably engaging the associated pinion to lock the same to the associated section, means on each section for releasing the locking device thereof, and a common actuating means for the pinions.

FRANK B. MILLER.